Nov. 7, 1950 S. C. SPIELMAN 2,529,428
AUTOMATIC GAIN CONTROL SYSTEM
Filed March 1, 1947
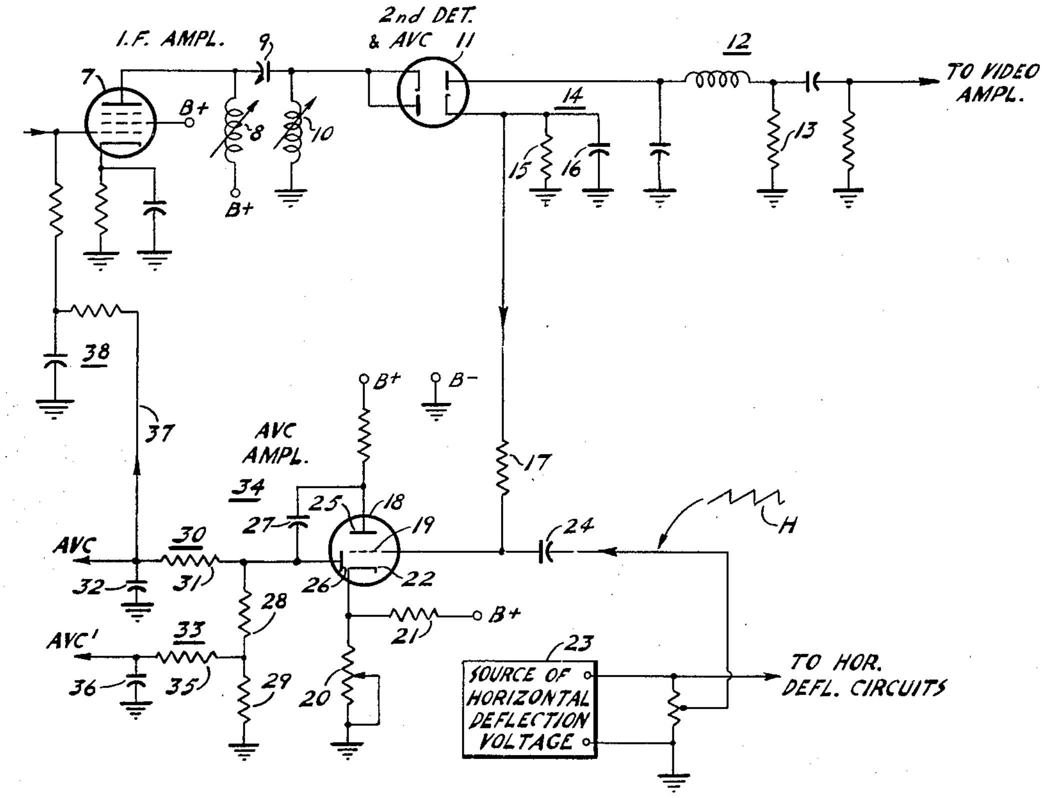
INVENTOR.
STERLING C. SPIELMAN
BY
Brown, Denk & Synnestvedt
AGENTS Patented Nov. 7, 1950 2,529,428

UNITED STATES PATENT OFFICE 2,529,428

AUTOMATIC GAIN CONTROL SYSTEM

Sterling C. Spielman, Huntingdon Valley, Pa., assignor to Philco Corporation, Philadelphia, Pa., a corporation of Pennsylvania Application March 1, 1947, Serial No. 731,757

7 Claims. (Cl. 179—171)

Then invention herein described and claimed relates to an improvement in automatic-volume-control (AVC) systems. More particularly, the invention provides improved means for obtaining an amplified AVC voltage. The invention may be employed to particular advantage in television receivers, but it will be clear from the description which follows that the utility of the invention is not limited thereto.

In radio broadcast receivers, the initially derived AVC voltage is usually adequate for volume control purposes, and amplification of the AVC voltage is not ordinarily attempted. Consequently, the difficulties which attend amplification of D.-C. voltages are not ordinarily encountered in the production of radio broadcast receivers.

In television receivers, however, it is very important that variations which may unavoidably occur in the strength of the received carrier be not permitted to produce noticeable variations in pitcure contrast and synchronizing-signal level. Experience has shown that a superior form of automatic-volume-control is required to attain this end. In the second place, unless an adequate AVC system is provided, the volume and contrast controls of the television receiver must be adjusted each time a different station is tuned in. And thirdly, a competent AVC system is required in order to compensate for variations in the television receiver's local power supply which otherwise produce objectionable variations in the video I.-F. gain.

In television receivers, then, it is important that the R.-F. input versus V.-F. output characteristic of the television receiver be substantially flat, the flatness of the characteristic being, of course, a function of the effectiveness of the AVC system. And it is well known that a flatter characteristic may be obtained when the derived AVC voltage is amplified, optimum flatness requiring a delayed system of automatic-volume-control in conjunction with high-gain AVC amplification.

But satisfactory amplification of D.-C. voltages is very difficult to achieve, as D.-C. amplifiers are inherently unstable. A second difficulty is that D.-C. amplifiers usually require a supply of high negative voltage; and such a supply is not ordinarily available, either in broadcast or television receivers.

The present invention provides improved means whereby amplification of AVC potentials is achieved in a very satisfactory manner. A small A.-C. voltage of substantially constant amplitude, preferably from a local source, is applied to the input circuit of an A.-C. amplifier. The conventionally derived AVC voltage is employed to vary the bias, and hence the gain, of the A.-C. amplifier. The amplified A.-C. voltages are rectified and filtered and the D.-C. voltage thus obtained is utilized in conventional manner, as an amplified AVC voltage, to control the gain of preceding I.-F. and/or R.-F. amplifier stages.

It will be seen that the magnitude of the amplified AVC voltage, obtained as described above, is a function of the gain of the A.-C. amplifier and hence varies directly with the magnitude of the original AVC voltage which controls the bias of the A.-C. amplifier. In the preferred embodiment, an AVC delay is provided as will be described in more detail. I have found the output characteristic of the second detector stage of receivers utilizing my invention to be extremely flat in the undelayed portion and to represent a substantial improvement over that obtained from unamplified, or D.-C. amplified, AVC signals.

It is an object of this invention to provide an improved amplified automatic-volume-control system.

It is another object of this invention to provide an improvement in the means for amplifying an AVC signal.

It is a further object of this invention to provide an amplified AVC system which does not require the employment of a D.-C. amplifier.

Another object of this invention is to provide an amplified AVC system which does not require a supply of high negative voltage.

These and other objects, features and advantages of the present invention will become clear from the following description of a preferred embodiment illustrated in the single figure of drawing.

In the drawing there is shown a portion of an otherwise conventional television receiver incorporating a preferred embodiment of the automatic-volume-control system of the present invention. Primary coil 8, coupling capacitor 9, and secondary coil 10 comprise the network which couples the last stage of the video I.-F. amplifier 7 to the second detector and AVC diodes 11. It will be understood that synchronizing signals as well as picture signals are included in the amplitude-modulated carrier wave applied to these diodes. Detection, i. e. rectification, of the I.-F. signal is accomplished by the upper diode element of tube 11. The rectified signal voltages are developed across network 12 which constitutes a conventional filter and load circuit, and the video signals appearing across load resistor 13 are applied to the grid of the first video amplifier stage.

The lower diode element of tube 11, in combination with RC network 14, comprising resistor 15 and capacitor 16, functions as a means for developing a D.-C. potential which is utilized for AVC purposes. For a reason which will become apparent hereinafter, the AVC diode is connected between the coil 10 and the network 14 in the direction shown in order that the rectified voltage appearing at the upper end of the network will be positive with respect to chassis. The time-constant of network 14 is long in comparison with the intervals between the horizontal synchronizing pulses to ensure that the AVC voltage appearing across the load resistor 15 is proportional to the peak applied carrier voltage (obtaining during the synchronizing signal intervals) rather than to the average carrier voltage which varies continuously as a function of video signal amplitude. Of course, the time constant of the network 14 should not be so long as to make it impossible for the voltage developed thereacross to follow, with reasonable promptness, significant changes in peak carrier amplitude. The AVC circuit thus far described is conventional, and well known to those skilled in the television arts.

In accordance with the present invention, the positive D.-C. voltage developed at the cathode-end of network 14 is applied by way of isolating resistor 17 to a gain-control electrode of an A.-C. amplifier. In the drawing, the triode unit of diode-triode 18 constitutes the A.-C. amplifier and the positive D.-C. voltage is shown to be applied to the amplifier's control grid 19. The triode unit of tube 18 preferably has a sharp cut-off characteristic and an amplification factor of the order of a hundred or more. The amplifier is initially biased beyond cut-off to an extent dependent upon the degree of AVC delay desired. In the drawing, bias is provided by means of adjustable cathode resistor 20 and bleeder resistor 21 connected as a voltage divider across a suitable source of voltage, B+. The value of cathode resistor 20 is small in comparison with that of bleeder resistor 21 so that the positive bias on cathode 22 is but a small portion of the full plate supply voltage, B+. It will be seen that, while the positive bias on cathode 22 is substantially fixed, the net negative bias on grid 19 of the triode varies as an inverse function of the D.-C. voltage applied to the grid by way of resistor 17. Consequently the gain of the amplifier, when conducting, varies as a direct function of the D.-C. voltage developed by the AVC diode element of tube 11.

An A.-C. voltage of substantially constant amplitude is also applied to an input circuit of the A.-C. amplifier. In the drawing, the A.-C. signal is shown to be applied to the same grid to which the unamplified AVC voltage is applied, namely control grid 19. However, if desired, the A.-C. amplifier may comprise a multi-grid tube in which case the AVC signal and the A.-C. voltage may be applied to different grids.

The A.-C. voltage may conveniently be obtained or derived from a source ordinarily available in the television receiver. For example, the A.-C. heater voltage, or the vertical-deflection voltage, may be employed. Preferably, however, the A.-C. voltage is obtained from the source 23 of horizontal-deflection voltage since the frequency thereof is sufficiently high to permit the employment of capacitors of smaller size (as for example, coupling capacitors 24, 27 and filter capacitors 32, 36) at a consequent saving in cost. The peak amplitude of the horizontal-deflection voltage will ordinarily be larger than required for the purposes of the present invention; and the drawing therefore shows only a portion of the horizontal-deflection voltage, represented by wave H, applied, by way of blocking capacitor 24, to control grid 19.

The magnitude of the substantially fixed bias on cathode 22 and the fixed peak amplitude of the A.-C. voltage applied to grid 19 together determine the effective AVC delay bias. It will be apparent that no plate current will flow in the triode section of tube 18 until the positive AVC voltage from tube 11 is of sufficient magnitude to so reduce the net negative bias on grid 19 of the triode that conduction occurs on the positive peaks of the A.-C. voltage. Manifestly, if the positive AVC voltage on grid 19 thereafter increases, the peak amplitude of the amplified A.-C. signal in the plate circuit of the triode will become correspondingly larger; and if the AVC voltage then decreases, the peak amplitude of the amplified A.-C. signal will become smaller.

The amplified A.-C. signal in the plate circuit of the triode section of diode-triode 18 is applied, by way of coupling and blocking capacitor 27, to anode 26 of the diode section of tube 18. Capacitor 27, in addition to serving as a coupling and blocking element, constitutes one of the components of RC network 34 comprising capacitor 27 and series-combined resistors 28—29. The time constant of network 34 is long in comparison with the length of a cycle of the sawtooth voltage H applied to tube 18.

The diode section of tube 18, in combination with network 34, operates as a peak detector to develop a D.-C. voltage across resistors 28—29 corresponding to the peak amplitude of the amplified A.-C. voltage. Of course, the diode circuit does not function, i. e. the diode does not conduct, until the peak-to-peak amplitude of the amplified A.-C. voltage exceeds the positive bias on cathode 22; but when this occurs, a negative D.-C. potential is developed across resistors 28—29 which is proportional to the amplitude of the A.-C. voltage present at the anode 25 of tube 18.

The negative D.-C. potential developed across resistors 28—29, herein termed the amplified AVC voltage, may be applied in conventional manner to the grids of preceding I.-F. and/or R.-F. amplifier stages by way of filter circuit 30 comprised of series resistor 31 and shunt capacitor 32. In the drawing, the filtered amplified AVC voltage is shown applied, by way of conductor 37 and additional filter circuit 38 to the grid of the last stage of video I.-F. amplifier 7. In some television receivers, it may be desirable to apply a portion only of the total amplified AVC voltage to one or more of the carrier-frequency stages, in which case a fraction of the amplified AVC voltage may be taken, as across resistor 29 only, and applied to the selected gain-control grids by way of filter circuit 33, comprised of series resistor 35 and shunt capacitor 36.

In practicing the invention, a circuit similar to that shown in the drawing, having the following pertinent parameters, was built and used with very satisfactory results as an amplified AVC system in a television receiver:

| | |
|---|---|
| Frequency of sawtooth wave H__cycles__ | 15,750 |
| Peak-to-peak amplitude of sawtooth wave H (approximate)________volts__ | 4 |
| B+ voltage____________________do____ | 245 |
| Resistor 20 (approximate adjusted value) ____________________ohms__ | 3,000 |
| Resistor 21____________________do____ | 82,000 |
| Capacitor 24____________microfarads__ | 0.01 |
| Capacitor 27__________________do____ | 0.01 |
| Resistor 17_______________megohms__ | 1 |
| Resistor 28___________________ohms__ | 470,000 |
| Resistor 29____________________do____ | 470,000 |
| Tube 18__________________________ | Type 7B6 |

In this detailed description given above, the initial AVC voltage was assumed to be derived from the video I.-F. signal, but it is to be understood that alternatively the initial AVC voltage may be derived, if desired, from the sound I.-F. channel.

Having described my invention, I claim:

1. An amplified automatic - volume - control (AVC) system comprising: a local source of alternating voltage whose amplitude is substantially fixed independently of the AVC system; means for amplifying said alternating voltage; a local source of unamplified AVC voltage; means for utilizing said unamplified AVC voltage to control the gain of said amplifying means; means for deriving a D.-C. voltage from said amplified alternating voltage; and means for utilizing said derived D.-C. voltage as an amplified AVC voltage.

2. An amplified AVC system as claimed in claim 1 characterized in the provision of delay means for rendering said A.-C. amplifier inoperative in the absence of the application thereto of said unamplified AVC voltage.

3. An amplified AVC system as claimed in claim 1 characterized in the provision of delay means for rendering said A.-C. amplifier inoperative until said applied AVC voltage attains a preassigned minimum magnitude substantially larger than zero.

4. In a television receiver having, inter alia, a vacuum tube amplifier operating at a carrier frequency and a source of voltage of picture line frequency whose amplitude is substantially constant independently of automatic gain control: an amplified automatic-gain-control system comprising, in combination, means responsive to a received carrier wave for developing a unidirectional voltage whose magnitude is proportional to the amplitude of said carrier wave, an A.-C. amplifier stage, means for applying said voltage of line frequency to an input circuit of said A.-C. amplifier stage, connections between said carrier-wave responsive means and said A.-C. amplifier stage for controlling the gain of said stage in accordance with the magnitude of said unidirectional voltage, means coupled to the output circuit of said A.-C. amplifier stage and responsive to the A.-C. component of output thereof for developing a unidirectional voltage whose magnitude is proportional to the amplified line-frequency voltage in said output circuit, and means for applying said last-named unidirectional voltage to a gain-control electrode of said vacuum tube amplifier.

5. An amplified automatic - volume - control (AVC) system for communication apparatus having amplifier stages, said AVC system comprising: a source of alternating voltage whose amplitude is substantially constant independently of the AVC system; an A.-C. amplifier; means for applying said alternating voltage to said amplifier; a source of AVC voltage; means for applying said AVC voltage to said amplifier; means for so biasing said amplifier that, in the absence of the application to said amplifier of an AVC voltage in excess of a predetermined value, the plate current of said amplifier is substantially zero, said alternating voltage being amplified to an extent which varies as a function of said applied AVC voltage whenever said applied AVC voltage exceeds said predetermined value; means for deriving a D.-C. potential corresponding in magnitude to the amplitude of said amplified alternating voltage; and means for utilizing said derived D.-C. potential as an amplified AVC voltage to control the gain of selected amplifier stages.

6. An amplified AVC system as claimed in claim 5 characterized in that said source of alternating voltage comprises a source normally available in said communication apparatus for other than AVC purposes.

7. An amplified automatic - volume - control (AVC) system for a television receiver having carrier-frequency amplifier stages and a source of horizontal-deflection voltage, said amplified AVC system comprising: an A.-C. amplifier; means for applying at least a portion of said horizontal-deflection voltage to said amplifier; means biasing said amplifier at least to cut-off for all instantaneous values of said applied horizontal-deflection voltage; means deriving an AVC voltage from a received and amplified carrier-frequency voltage; means applying said AVC voltage to said A.-C. amplifier to so control the gain thereof that said amplifier becomes operative at a preselected minimum value of said AVC voltage; means for deriving a D.-C. voltage from the A.-C. component of the voltage developed in the output circuit of said amplifier; and means for utilizing said derived D.-C. voltage as an amplified AVC voltage to control the gain of selected carrier-frequency amplifier stages.

STERLING C. SPIELMAN.

REFERENCES CITED

The following references are of record in the file of this patent:

UNITED STATES PATENTS

| Number | Name | Date |
|---|---|---|
| 2,118,287 | Koch | May 24, 1938 |
| 2,251,929 | Freeman et al. | Aug. 12, 1941 |
| 2,303,909 | Blumlein | Dec. 1, 1942 |
| 2,332,681 | Wendt | Oct. 26, 1943 |

FOREIGN PATENTS

| Number | Country | Date |
|---|---|---|
| 845,897 | France | Sept. 4, 1939 |
| 873,623 | France | July 5, 1942 |